United States Patent
Vertes et al.

(10) Patent No.: US 7,577,720 B2
(45) Date of Patent: Aug. 18, 2009

(54) MIGRATION METHOD FOR SOFTWARE APPLICATION IN A MULTI-COMPUTING ARCHITECTURE, METHOD FOR CARRYING OUT FUNCTIONAL CONTINUITY IMPLEMENTING SAID MIGRATION METHOD AND MULTI-COMPUTING SYSTEM PROVIDED THEREWITH

(75) Inventors: Marc Vertes, Saint Lys (FR); Laurent Dufour, Plaisance du Touch (FR)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 10/523,025

(22) PCT Filed: Jul. 28, 2003

(86) PCT No.: PCT/FR03/02372

§ 371 (c)(1),
(2), (4) Date: Feb. 2, 2005

(87) PCT Pub. No.: WO2004/015513

PCT Pub. Date: Feb. 19, 2004

(65) Prior Publication Data

US 2005/0262411 A1    Nov. 24, 2005

(30) Foreign Application Priority Data

Aug. 2, 2002    (FR) .................................. 02 09856

(51) Int. Cl.
*G06F 15/16* (2006.01)

(52) U.S. Cl. .................... 709/219; 709/203; 370/229

(58) Field of Classification Search ................. 709/209, 709/219, 223; 370/229
See application file for complete search history.

(56) References Cited

U.S. PATENT DOCUMENTS 6,182,139 B1   1/2001 Brendel (Continued)

FOREIGN PATENT DOCUMENTS

EP   1 096 751   5/2001

OTHER PUBLICATIONS

Hua Zhong and Jason Nieh: "Crak: Linux Checkpoint/Restart As a Kernel Module" *Technical Report* CUCS-014-01, Nov. 2001, pp. 1-18, XP002319367, Columbia University.

(Continued)

*Primary Examiner*—Jason Cardone
*Assistant Examiner*—Adnan M Mirza
(74) *Attorney, Agent, or Firm*—Yee & Associates, P.C.; Matthew W. Baca

(57) ABSTRACT

A method for carrying out a connection migration in a multicomputing architecture (cluster), from a first node which is called a primary node or operation node, including a first computer of the cluster on which an initial software application is run, towards at lest one secondary node including another computer of the cluster. The method implements a virtual network address which is carried by the first computer and transferred to the other computer, the virtual network address being embodied in the form of a dialogue link between the cluster and client computers connected thereto and associated with the software application. The associated connections can, for example be associated with a software application which is replicated in another computer in such a way that the initial application service is switched to the replica thereof.

1 Claim, 3 Drawing Sheets

U.S. PATENT DOCUMENTS 6,366,558 B1    4/2002    Howes et al.

OTHER PUBLICATIONS

Fan, C. et al., "Experiences with a protocol stack for multimedia transport", *Networks*, 1995, pp. 617-621 XP010196162.

Mac UNIX Man Pages Primitives Setsockopt and Getsockopt, 'en ligne! XP002243640, extract of Jun. 11, 2003.

"White Paper: Network Load Balancing Technical Overview", Microsoft Windows 2000 Server, 'en ligne! Mar. 2000, XP 002243641.

MIGRATION METHOD FOR SOFTWARE APPLICATION IN A MULTI-COMPUTING ARCHITECTURE, METHOD FOR CARRYING OUT FUNCTIONAL CONTINUITY IMPLEMENTING SAID MIGRATION METHOD AND MULTI-COMPUTING SYSTEM PROVIDED THEREWITH

The present invention concerns a method for migrating connections within a multi-computer architecture. It also relates to a method ensuring functional continuity of a software application within a multi-computer architecture (cluster), thereby implementing such migration method, as well as a multi-computer system implementing said functional continuity method.

The field of the invention is that of the computer clusters composed of several computers co-operating with one another. Such clusters are for example provided for executing software applications. Thus, at a given time, an application is run on one of the computers of the cluster, called primary or operational node (OP), while the other computers of the cluster are called secondary or "stand-by" (SB) nodes, in a redundant architecture context.

Still, the operation of such clusters shows that reliability problems arise, which may be due to faults in the hardware of the operating system, to human errors or to faults in the applications properly speaking.

To solve these reliability problems, there are currently so-called high-availability mechanisms, which are implemented in most of the current clusters and which are based upon a cold re-start of the application on a back-up node among one of the secondary nodes of the cluster.

Still, these mechanisms based upon automatic re-start do not guarantee total continuity of the services provided by the application in progress at the time of the fault.

In particular, there is the complex problem of network connections migration which ought to be solved when switching service between two computers within a cluster.

A first object of the present invention is to provide a method for carrying out a connection migration in a multi-computer architecture (cluster), from a first node, called primary node, comprising a first computer in said cluster whereon an initial software application is executed, towards at least one secondary node, comprising another computer in said cluster.

This first object is met with such a migration method implementing a virtual network address which is carried by the first computer and which is transferred to the other computer, said virtual network address being provided as a dialogue link between the cluster and clients computers connected to said cluster and affected by the software application.

In an advantageous embodiment, the messages from a customer are captured before being taken into account by the network layer of the cluster. In particular, when such migration process is implemented in the context of a TCP/IP protocol, the messages are captured at the "IP" tables level.

A connection migration may also be applied, beyond the fault tolerance, to the mobility of the networks: reconnection of a laptop computer or other communicating device mobile from one physical network to another, without losing applicative contexts and connections, whereas the existent solutions implement an intermediate server which is not needed with the migration method according to the invention.

With respect to the previous research works on connection migration, the method described according to the invention exhibits the following advantages:
it does not require modifying the transport protocol TCP, in spite of the limitations shown by said protocol,
consequently, the remote machines are not impacted in any way as the method is implemented,
implementing the connection migration does not call for any modifications in the operating system, but simply loading an independent dynamic kernel module.

The "socket IP-UDP"-based transport protocols are also automatically taken into account, regardless of their characteristics (example: audio or video streaming protocols).

It is important to note that the connection migration method according to the invention may take into account a plurality of secondary or "stand-by" nodes, providing thereby certain scalability.

The migration method according to the invention may be advantageously, through not limited thereto, implemented for the migration of connections which are associated with a software application intended to be replicated on another computer in order to switch service from the initial application to the replica thereof.

The connection migration method according to the invention may also be implemented in a complete stand-alone fashion, independently of situations such as switching from one machine to another or replicating software applications.

One may thus contemplate applying the migration method according to the invention for automatic optimisation of computer resources by load sharing, by dynamic process distribution. This migration method may also be used for non-interruptive maintenance by process re-location upon request, over an data-processing resource network, or for preservation of applicative context in mobile applications.

Another object of the present invention is to provide a method ensuring functional continuity of a software application in a multi-computer architecture (cluster), whereas said application is run at a given time on one of the computers of the cluster, called main node, whereas the other computers of said cluster are called secondary nodes, said method implementing the connection migration method according to the invention.

This other objective is met with a method comprising the following steps:
streamlined or on-the-flow updating of at least one clone of the application on at least one of the secondary nodes,
when detecting a fault or an event affecting said main node, switching the service towards one at least of said clones, and
migrating network connections.

Thus, with the migration method according to the invention, it is possible as of now, thanks to the migration of the network connections, to make service switching towards clones transparent to the outside world communicating with the application.

Besides, the connection migration mechanism implemented in the migration method according to the invention does not involve modifying the source code of the application and is therefore non-intrusive in the application, as distinguished from the migration methods of the previous art.

The clones implemented in the functional continuity method according to the invention are said to be "hot", i.e. they are the perfect replica of the application and of its entire operating context. They are updated regularly (periodically or in case of characteristic events). These clones include all the resources and information required by the application to provide an appropriate service.

The functional continuity method according to the invention enables moreover to supervise the state of all the resources necessary to the correct operation of the application. If one of them is detected as irreversibly damaged, the functional continuity method according to the invention provides the election of a clone as a new primary and instructs it to take over.

This election is called a switch and is transparent for the rest of the world which communicates with the application: although the primary node is put out of service, the service provided by the application is not interrupted since it has been taken over with its entire context by the clone elected.

It may be thus guaranteed that any message transmitted by the rest of the world to the application will be processed, either by the primary node (pre-switch) or by the clone (post-switch). To do so, the functional continuity method according to the invention may also comprise a record on each clone (on top of the periodic cloning mechanism) of all the messages received by the primary since the last update of the clones. These messages will be re-injected into the clone elected as new primary in case of switch.

Holistic replication, to be complete, includes the replication of "kernel" resources, such as for example the state of the protocol stacks implemented for managing the connectivity of the protected application with the outside world (its "clients").

An important advantage provided by the migration process according to the invention is to make switching the applicative service from a primary to a secondary node transparent for the clients of the application. Technically, it means that the connections established by the clients with the application when operating on the primary, must be transmitted (migrated) towards the clones and must not be interrupted during switching. This requirement is not trivial since, for the applications affected by the functional continuity method according to the invention, the outside world (the clients) communicates with the application essentially via TCP/IP connections, a point-to-point protocol "attached" to the physical machines whereon applications and clients reside.

The functional continuity method according to the invention solves this problem by implementing a mechanism replicating the state of the protocol stack as well as a recording/replay system which enables, after switching, re-injecting the messages received by the primary node before switching, but not taken in account by the clone as yet.

The state of the stack, in the kernel of the operating system, is introspected periodically (analysed and captured) on the primary machine, this state being transferred with the holistic checkpoint and restored on the secondary nodes.

In parallel, all the messages received by the master node are intercepted at the lowest level (before being delivered to the application on the primary node) and transferred to be recorded on the secondary nodes. On the secondary nodes, these messages are saved since the last checkpoint received.

In case of switching, the elect secondary node takes over by running the application from its last checkpoint (such checkpoint is slightly in the past with respect to the application when switching, since received periodically by the secondary nodes).

To bring such clone back to the present state, i.e. in the application state at the time of switching, the recorded messages are re-injected. Through replaying them, the new primary made clone then reaches the application state at the time of switching. This replay, in some cases, may be accelerated (time compression, elimination of the 'blanks'). During such replay, the communications with the outside world are closed. If new messages are received from customers during the replay, they are rejected, but without any disconnection. This reject will be managed by the protocol (flow control) and will be seen by the customers as a slowed-down network or service.

It should be noted that the replay involves the specific adjunction of a messages injection channel into the reception queue of the network interface driver independently of the physical network, the frame transmission system not enabling re-looping (half-duplex of inputs/outputs) on the physical interfaces.

Once the replay completed, the clone is in the exact state of the application before switching and takes over by re-opening the communications with the outside world.

It should be noted that, in certain configurations and according to the intended purpose, it is possible to implement the hot switching policy on a clone, without implementing said replay. The impacts of such a recovery scenario are as follows:

interrupting the connections in progress, hence, for the clients connected on active sessions, a level protection lower than that provided by the replay, immediate hot recovery (applicative context preserved) (no replay times during which the new messages are time-delayed), hence faster restoration of the rated service, while accepting new customers faster.

The implementation of either of these recovery policies is an adaptable parameter.

It should be noted that, to implement the migration method according to the invention, non-intrusive software engineering techniques may be used advantageously, techniques mentioned in a patent application published on 2 Aug. 2002 under the number FR2820221. These software engineering techniques enable to handle applications in their binary (executable) representation, in order to make the method ensuring functional continuity according to the invention transparent for the application, and therefore generic.

According to another aspect of the invention, there is provided a multi-computer system for executing on at least one of the computers at least one software application, implementing the method ensuring functional continuity according to the invention.

Other advantages and features of the invention will appear in conjunction with the detailed description of an embodiment, without being limited thereto, and the appended drawings whereon:

We shall now describe, with reference to the figures afore mentioned, the operation of the network connections migration mechanism implemented in the migration method according to the invention.

The migration of the connections is based upon the usage of a virtual network address, so-called cluster virtual address. This address is carried by the machine which contains the operational application. It is transferred towards a machine SB when switching. The customers must refer to the cluster-run application by dialoguing on this virtual address.

The messages are captured before being taken into account by the network layer. On TCP/IP, this capture is made at the "IP Table" which ensures portability thereof.

The messages received on the virtual address IP allocated to the cluster are transmitted to the machine(s) SB over a multicast-type reliable channel (simultaneous broadcast towards several addressees), seeing to the transmission of the packages. When the message is received on all the machines SB, the former is transmitted to the network layer of the operational node OP. Failing which, the message is deleted (the transport layer of the remote node ensuring the broadcast).

This mechanism enables to guarantee that a message may be replayed on a machine SB when taken into account on the operational node OP. The filtering 'IP Tables' enables to focus only on the message regarding the virtual address of the cluster.

When dumping, a dump mark is transmitted to the machines SB in order to date the dump in the log. Thus, one knows from which package to replay, if switching.

The module "IP tables" is a kernel module independent of the TCP/IP layer, which is loaded dynamically. No modification in the TCP/IP stack is required neither on the cluster nor on the remote machines.

The generic system calls getsockopt and setsockopt are extended, via a driver, to capture/modify the following socket parameters:

local and remote ports
local and remote reference number
number of the next packet to be transmitted, and expected transmission and reception timer
window size
etc.

Backing-up the state of the socket also takes into account the list of packages pending transmission (send queue), those which are in transit (transmitted but not acknowledged), and the packages received, but which have not been read as yet by the application (receive queue).

The back-up process takes place in the context of the process when dumping, after the transmission of the log mark. This mechanism ensures that all the packages will be replayed. If a package is received between the transmission of the log mark and the capture of the state of the socket, said state is ignored automatically by the transport layer when switching. Such process is an essential element of the transport layer.

The extension of the system calls getsockopt and setsockopt is made by a dynamically loaded kernel module which does not require any modification in the kernel source code.

Figure 1:
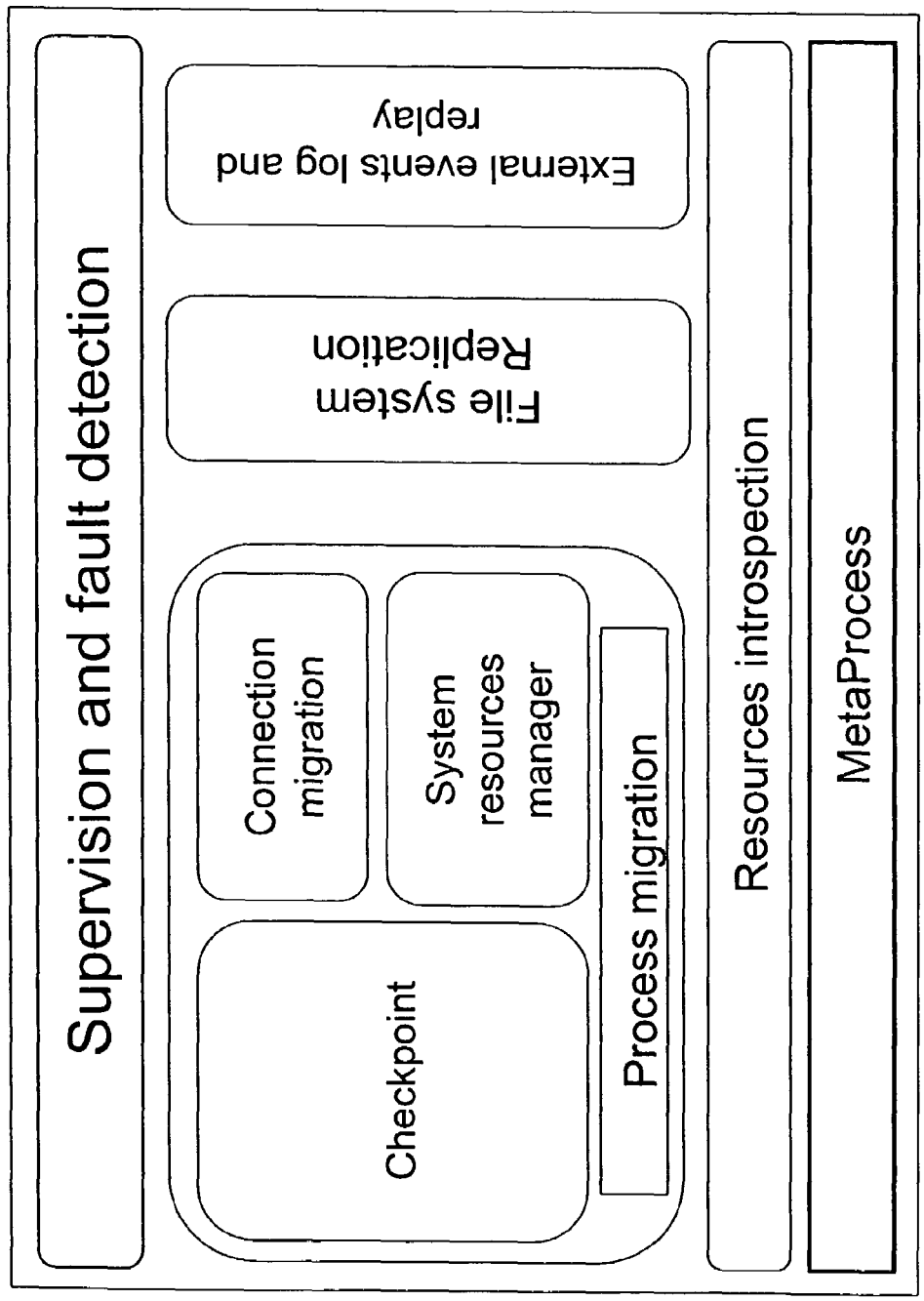
FIG. 1 illustrates schematically an example of embodiment of the migration method according to the invention within a functional continuity method.

The connection migration method according to the invention may be integrated directly within a functional continuity method for a cluster of machines, with reference to FIG. 1. Such a system implements a fault detection and a supervision, a process migration mechanism including a checkpoint mechanism, a connection migration mechanism according to the invention and a system resources manager. This functional continuity method also includes a resources introspection function, a mechanism for replicating the file system, a mechanism for editing and updating an events log, and a replay mechanism.

We shall now describe the switching mechanism implemented in a migration of the network connections within the migration method according to the invention.

When a machine SB becomes an operational node OP, the virtual address IP is created on the new operational node OP, but the filtering rules prohibit any in-coming message from the outside during the playing sequence. Once the playing sequence completed, the filtering rules are modified in order to dispatch the messages over the machines SB.

If messages are transmitted by the remote site, they will be destroyed upon arrival in the newly-made machine OP, and will be retransmitted on "time out" by the remote layer. This mechanism is one of the essential elements of the transport layer.

Re-creating the sockets (communication layers) unfolds in two phases:
before replay towards a loopback (virtual storage device),
after replay with reconnecting them towards the outside.

Before replay, the sockets are connected to a loopback which enables re-injection of the packages recorded since the last restoration.

The parameters of the socket saved during the previous dump are restored via the extended call setsockopt.

The packages recorded since the last restoration are transmitted towards the transport layer as if they had been received directly from remote equipment (clients). The messages transmitted by the transport layer are automatically destroyed so as not to disturb the remote node.

Upon completion of the replay, the state of the socket corresponds to that on the operation node OP before switching. It is then possible to resume dialogue with the remote node. Such resuming takes place while modifying the socket parameters regarding the address of the remote node, and while modifying the filtering rules to authorize input and output of messages on the virtual address of the cluster. The dialogue then resumes normally.

Figure 2:
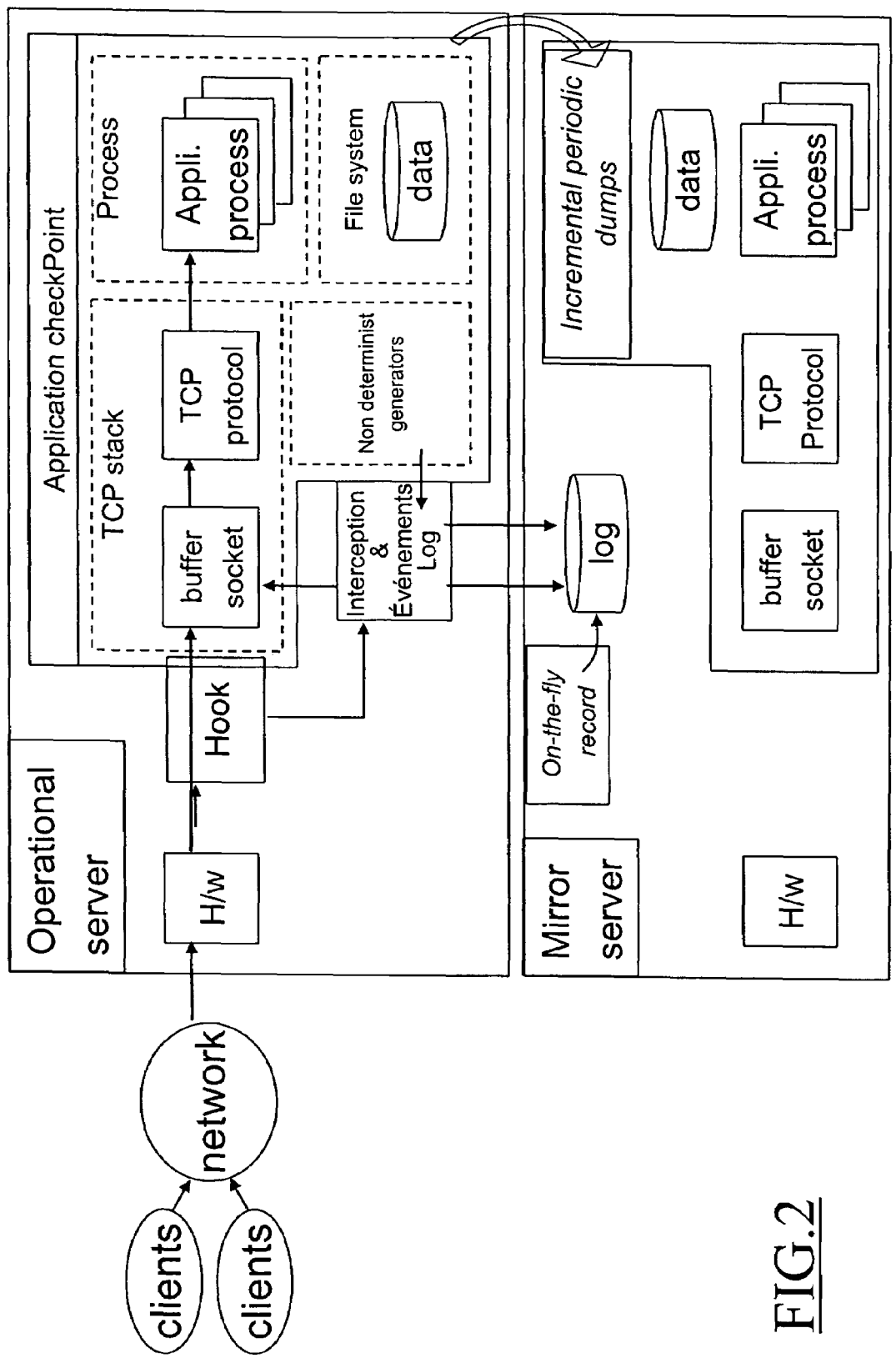
FIG. 2 illustrates schematically a check pointing mechanism implemented in a functional continuity method according to the invention.

The connection migration method according to the invention may be implemented within the framework of an interaction between an operational server and a mirror server as illustrated on FIG. 2, wherein a checkpoint mechanism is active, with a generation of incremental periodical dumps.

Figure 3:
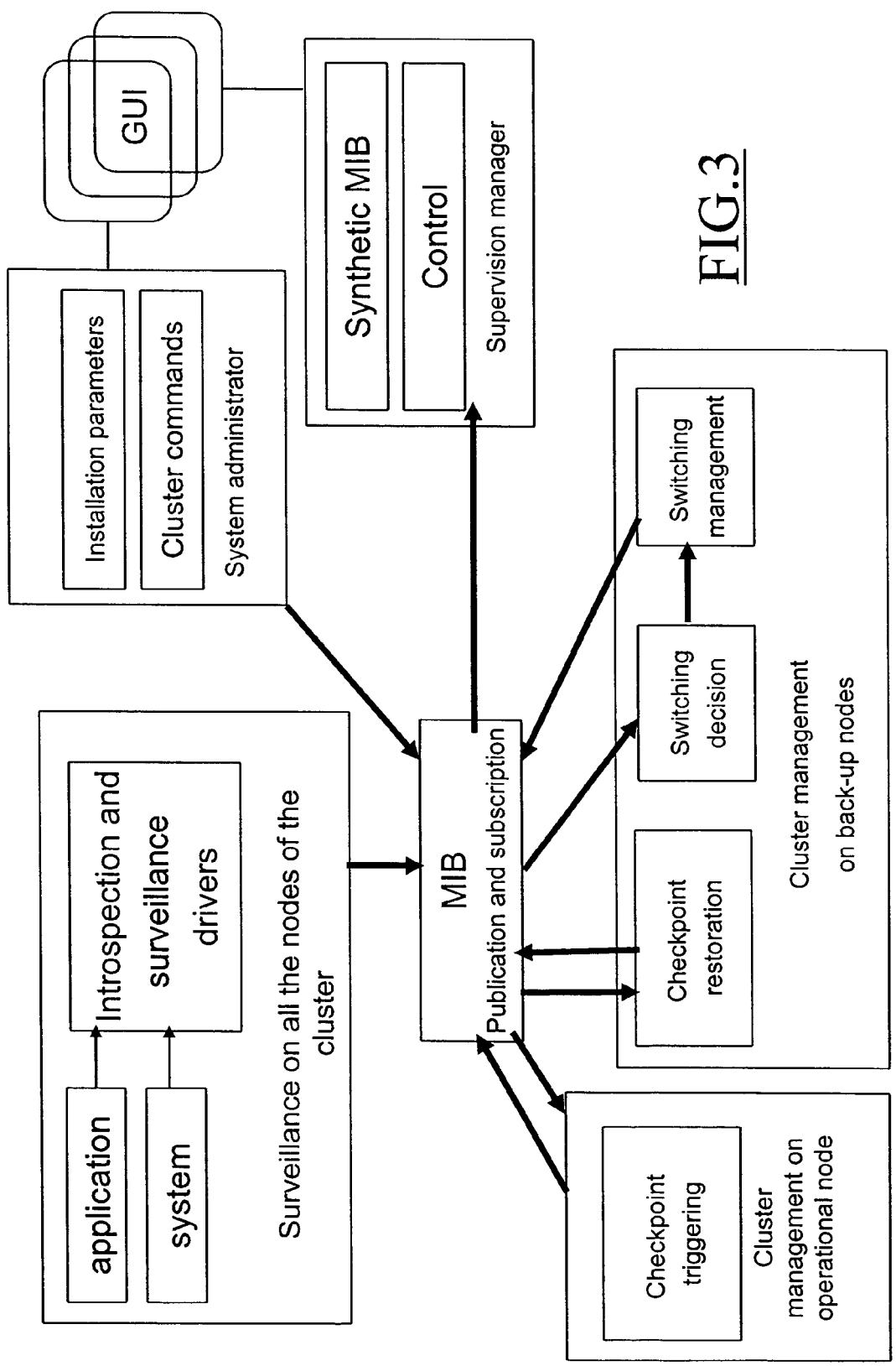
FIG. 3 illustrates schematically supervision and surveillance functions fulfilled on the nodes of a multi-computer system (cluster) according to the invention.

For implementing a functional continuity method according to the invention, between an operational node of a cluster and one or several secondary nodes of this cluster, an MIB (Management Information Base) base is accessed by introspection and surveillance drivers and by cluster commands, with reference to FIG. 3. This MIB base is involved in the cluster management on the operational node and on back-up nodes for various functions such as restoration and checkpoint, switching decision, and organization of this switching. A supervision manager supplied by the MIN base fulfils control and MIB synthetic functions, in relation to a graphic user interface GUI.

Obviously, the invention is not limited to the examples which have just been described and numerous amendments may be made thereto, without departing from the framework of the invention.

The invention claimed is:

1. A method for carrying out a connection migration and functional continuity of a software application in a multi-computer architecture, the method comprising:

executing, from a first node, an initial software application on a first computer in the multi-computer architecture, wherein the first node is a primary node, and wherein the initial software application is executed towards at least one secondary node, wherein the at least one secondary node is on a second computer in the multi-computer architecture;

implementing a virtual network address which is carried by the first computer;

transferring, by the first computer, the virtual network address to the second computer;

providing the virtual network address as a dialogue link to client computers connected to the multi-computer architecture and affected by the initial software application, wherein the initial software application is intended to be replicated on at least one other computer in order to enable a service switch from the initial software application the a replica software application;

capturing messages issued from a client before the messages are taken into account by a network layer of the multi-computer architecture, wherein the messages are captured at the IP tables level in the context of a protocol TCP/IP;

capturing socket parameters via extended generic system calls;

modifying the socket parameters via the extended generic system calls, wherein the socket parameters that are captured and modified include at least one of local and remote ports, local and remote reference number, number of a next packet to be emitted and expected, emission and reception timer, and window size;

backing up a list of packages pending transmission, packages in transit, and packages received but not yet read by the initial software application;

transmitting the messages to the second computer over a multicast-type channel;

updating, on-the-flow, at least one clone from a plurality of clones installed on the secondary node of the initial software application, wherein the at least one clone is updated periodically, wherein the updating of the at least one clone is triggered by one or more characteristic events, and wherein each clone in the plurality of clones includes a record of the messages received by the primary node;

responsive to detecting a fault or an event affecting the first node, electing the at least one clone from the plurality of clones to be substituted for the initial software application;

switching to the at least one clone, wherein the at least one clone becomes the new primary node, and wherein the record of the messages received by the primary node are re-injected into the new primary node;

responsive to switching to the at least one clone, migrating network connections; and supervising a state of resources necessary to operation of the initial software application.

* * * * *